United States Patent

Oster et al.

[15] 3,681,758

[45] Aug. 1, 1972

[54] DATA ACQUISITION UNIT WITH MEMORY

[72] Inventors: Stanley Oster, Anaheim; Herbert I. Higashi, Rowland Heights; Otto Dorner, Fullerton, all of Calif.

[73] Assignee: Northrop Corporation, Beverly Hills, Calif.

[22] Filed: April 29, 1970

[21] Appl. No.: 32,899

[52] U.S. Cl. ........................................... 340/172.5

[51] Int. Cl. ....................... G05b 19/42, G05b 23/02

[58] Field of Search .......340/172.5, 146.2; 324/73 R, 324/73 AT

[56] References Cited

UNITED STATES PATENTS

| | | | |
|---|---|---|---|
| 3,344,406 | 9/1967 | Vinal | 340/172.5 |
| 3,535,683 | 10/1970 | Woods et al. | 340/172.5 |
| 3,290,648 | 12/1966 | Smeltzer | 340/146.2 |
| 3,303,471 | 2/1967 | Duncan et al. | 340/172.5 |
| 3,400,374 | 9/1968 | Schumann | 340/172.5 |
| 3,551,893 | 12/1970 | Mehnert et al. | 340/172.5 |
| 3,387,282 | 6/1968 | Jacques | 340/172.5 |
| 3,585,603 | 6/1971 | Ross | 340/172.5 |

*Primary Examiner*—Harvey E. Springborn
*Attorney*—William W. Rundler and Willard M. Graham

[57] ABSTRACT

A small automatic test system having input connections for a multiplicity of test points from an outside system to be tested. This test unit rapidly scans through the test points and measures the voltage value at each point as compared to a predetermined tolerance range recorded in the test system memory, giving a GO and NO GO type of display along with the measured value and the corresponding test point number of a NO GO measurement. The limits defining the tolerance range for each test point measurement are loaded into the memory from a magnetic tape unit or from a manual loader, which units are parts of the present test system. The tape may be pre-recorded or made up on the test system itself. Operating speed of the system is over 2500 test points per second.

14 Claims, 10 Drawing Figures

INVENTORS
Stanley Oster
Herbert I. Higashi
Otto Dorner
By William W. Rundle
AGENT INVENTORS.
Stanley Oster
Herbert I. Higashi
Otto Dorner
By William W. Rundle
AGENT INVENTORS-
Stanley Oster
Herbert I. Higashi
Otto Dorner
By William W. Rundle
AGENT INVENTORS.
Stanley Oster
Herbert I. Higashi
Otto Dorner
By William W. Rundle
AGENT INVENTORS.
Stanley Oster
Herbert I. Higashi
Otto Dorner
By William W Rundle
AGENT INVENTORS.
Stanley Oster
Herbert I. Higashi
Otto Dorner
By William W. Rundle
AGENT

DATA ACQUISITION UNIT WITH MEMORY

The present invention relates to testers, and more particularly, to a high speed electronic data acquisition unit with memory.

Large automatic test units are in use for testing or monitoring certain complex electronic or electromechanical systems. Such test units are many times restricted to application with only a single system under test. Some of the conventional test units do employ a magnetic or punched tape programmer which is replaceable by another tape assembly for use with a different system under test, but the operation of the test unit is relatively slow.

It is an object of the present invention to provide a fast operating, reliable, portable tester for any kind of system which has or can be adapted to have an electrical signal or value present at a plurality of points therein.

A further object is to provide a data acquisition unit having an electronic memory which carries the appropriate limit values for each test point under consideration, and which can be rapidly changed to carry a different set of limit values.

Still another object of this invention is to provide a data acquisition unit which is very flexible in operation, that is, it can be controlled by the operator to display the NO GO information (if any) in a variety of ways, or to display only the measured value or limits of a single selected test point only.

A still further object is to provide automatic control means for correcting portions of a system under test which exceed the tolerance limits.

Briefly, our invention comprises a multiplexer capable of sequentially connecting each of any number of input test points to a measurement circuit comprising an analog-to-digital converter and comparator, a high speed memory to apply the high and low limits to the comparator in synchronism with the measured data, a NO GO detector connected to the output of the comparator, and display means to indicate the NO GO information. Timing and signal generating means, together with logic circuitry as required, run the system at a desired speed and furnish appropriate internal commands at proper times. The invention includes means for rapidly changing the memory content so that various pre-recorded sets of tolerance limits may be carried and inserted for automatically testing a given system to different sets of tolerance limits or for completely different systems.

The memory changing means preferably comprises a plug-in manual loader for point-by-point memory loading, and an alternate plug-in recording tape unit for either automatically recording on the tape the entire memory content at a "record" command or automatically loading the memory from the taped limit information at a "playback" command.

For automatically correcting conditions which cause a NO GO indication at a certain test point, control and actuating means are triggered by logic means responsive to a NO GO signal at that test point, to drive an adjustable element of the system under test in the proper direction to reduce and eliminate the error.

This invention may be more fully understood by reference to the detailed description of a preferred embodiment to follow, and to the accompanying illustrative drawings.

Figures 4, 9:
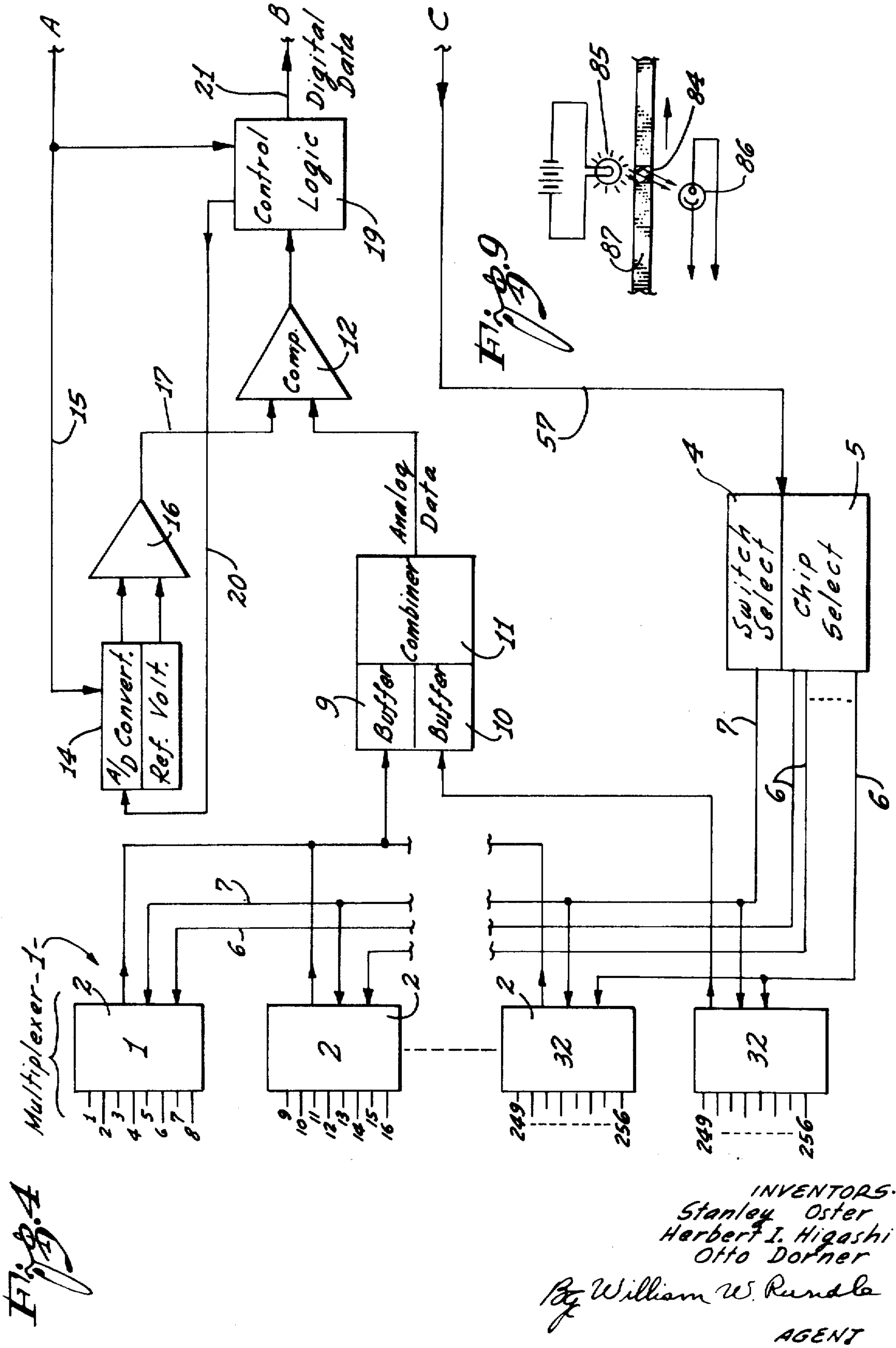
Figure 5:
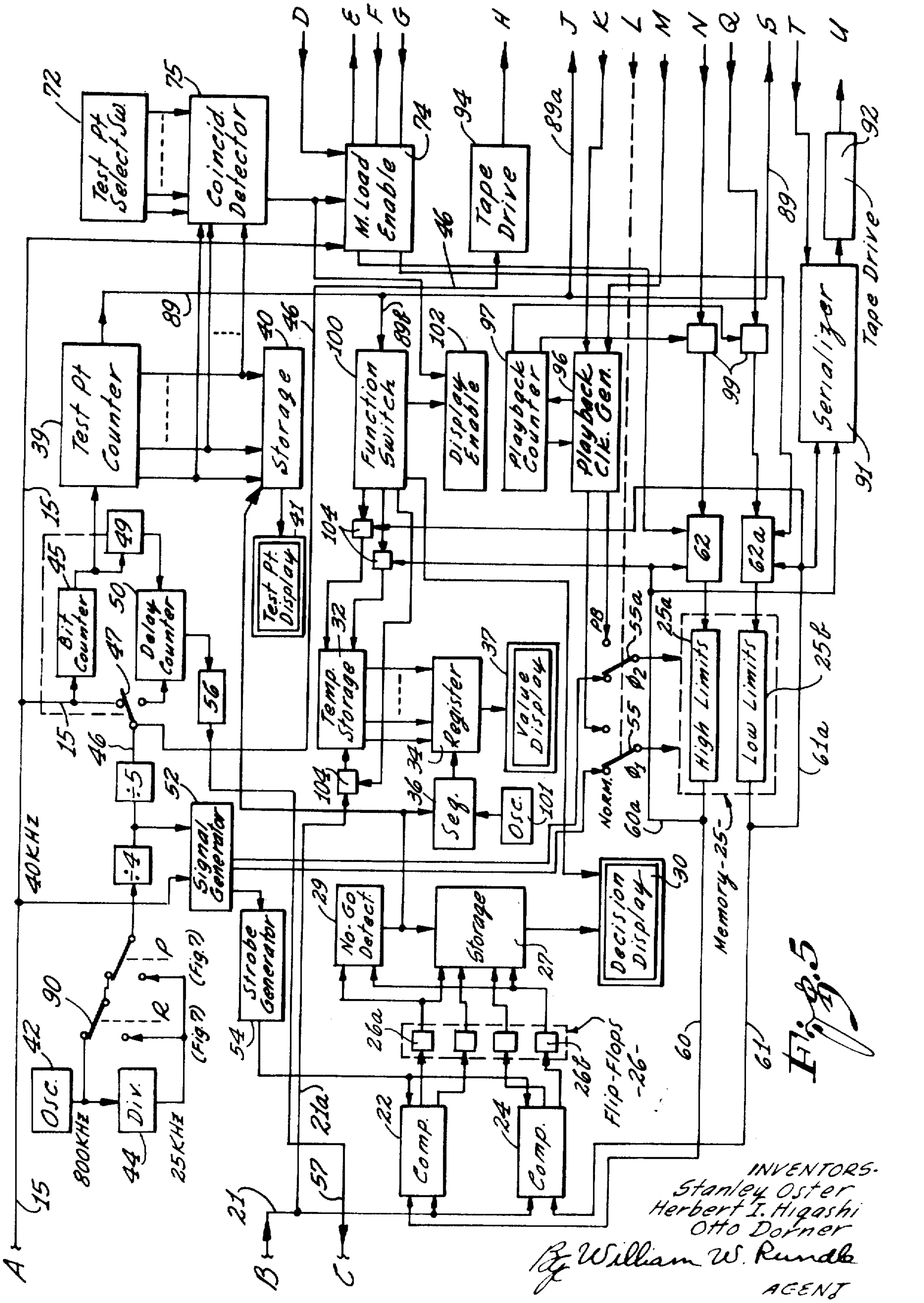

FIGS. 4 and 5 together constitute a block diagram of the main test unit, showing connections of all internal components, the right-hand side of FIG. 4 mating with the left-hand side of FIG. 5.

Figure 6:
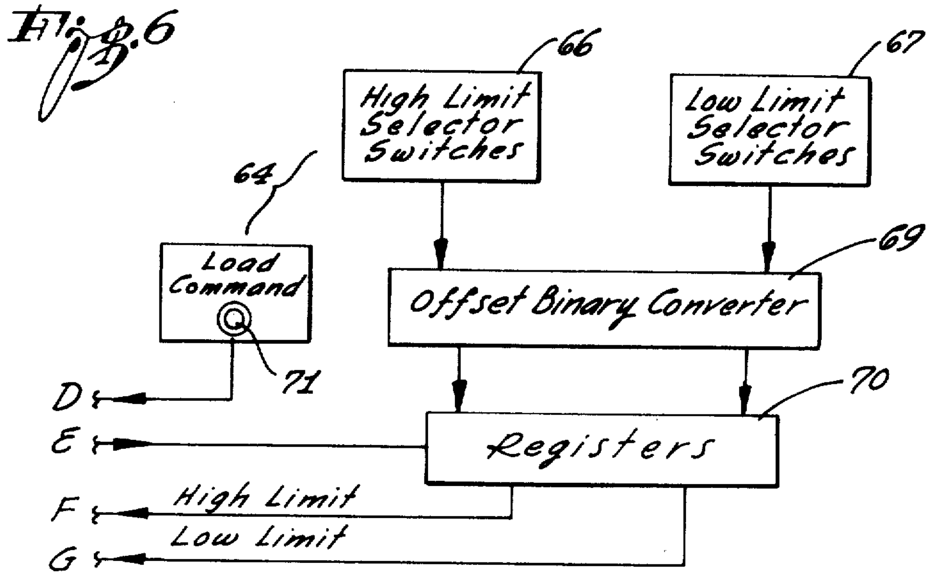

FIG. 6 is a block diagram of the manual loader for the memory, showing its internal components and mating connections with the right-hand side of the main unit in FIG. 5.

Figure 7:
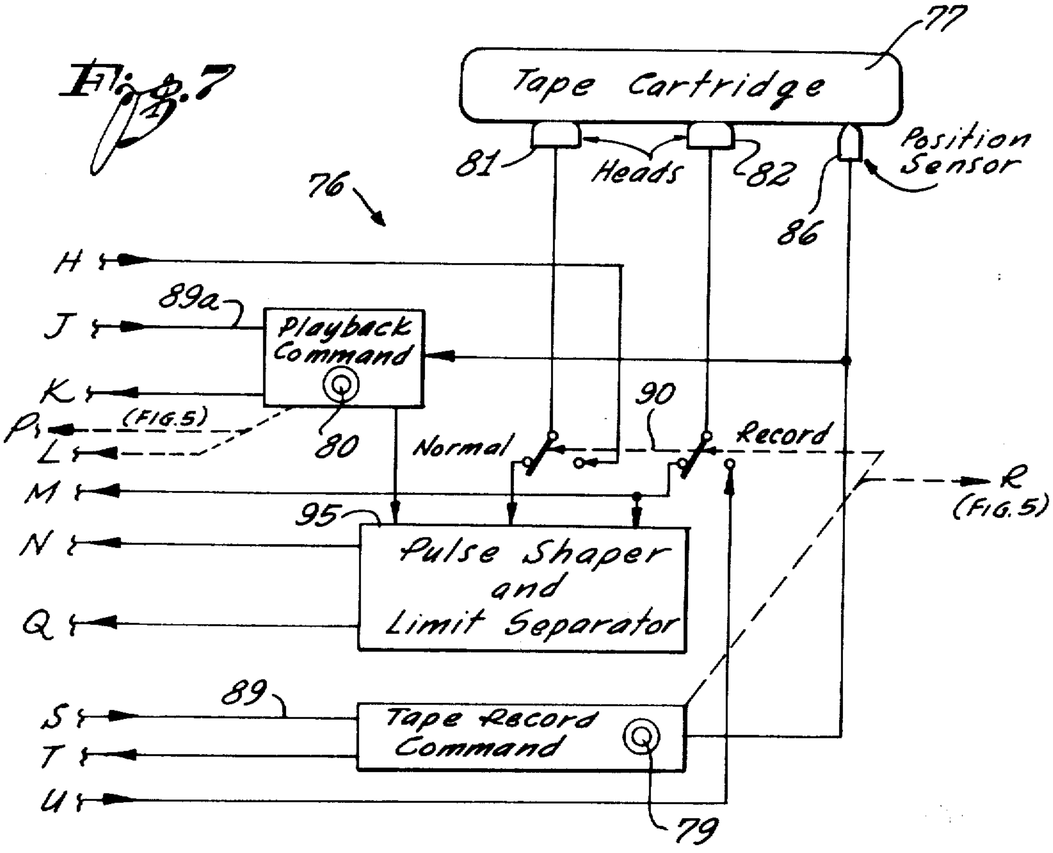

FIG. 7 is a block diagram of the automatic tape loader for the memory, showing internal components and connections with the right-hand side of the main unit in FIG. 5.

Figure 8:
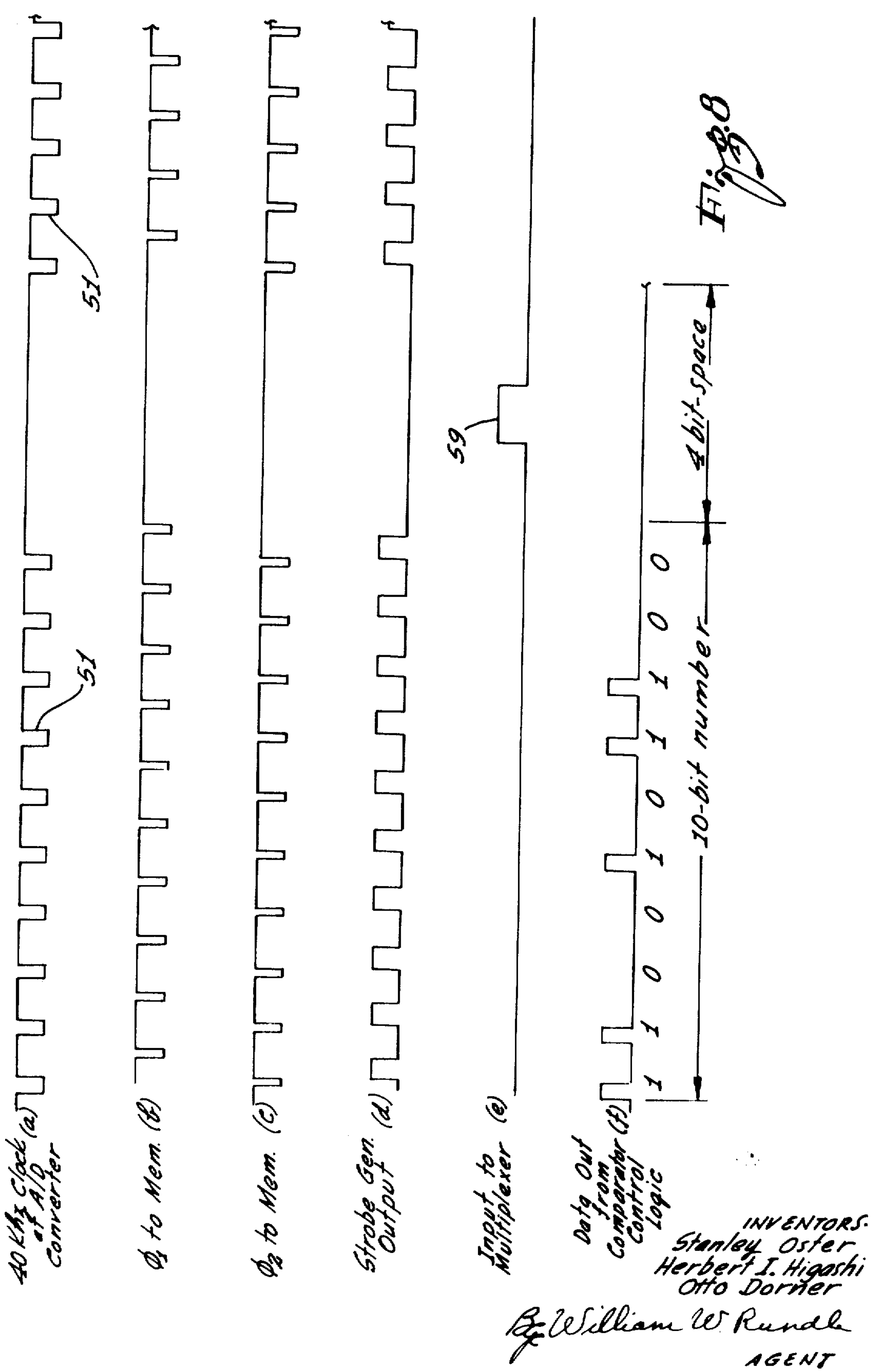

FIG. 8 is a waveform diagram showing the time relationships of various signals in the test unit.

FIG. 9 is a pictorial view showing a means of sensing a desired position on a magnetic tape as used in this invention.

Figure 10:
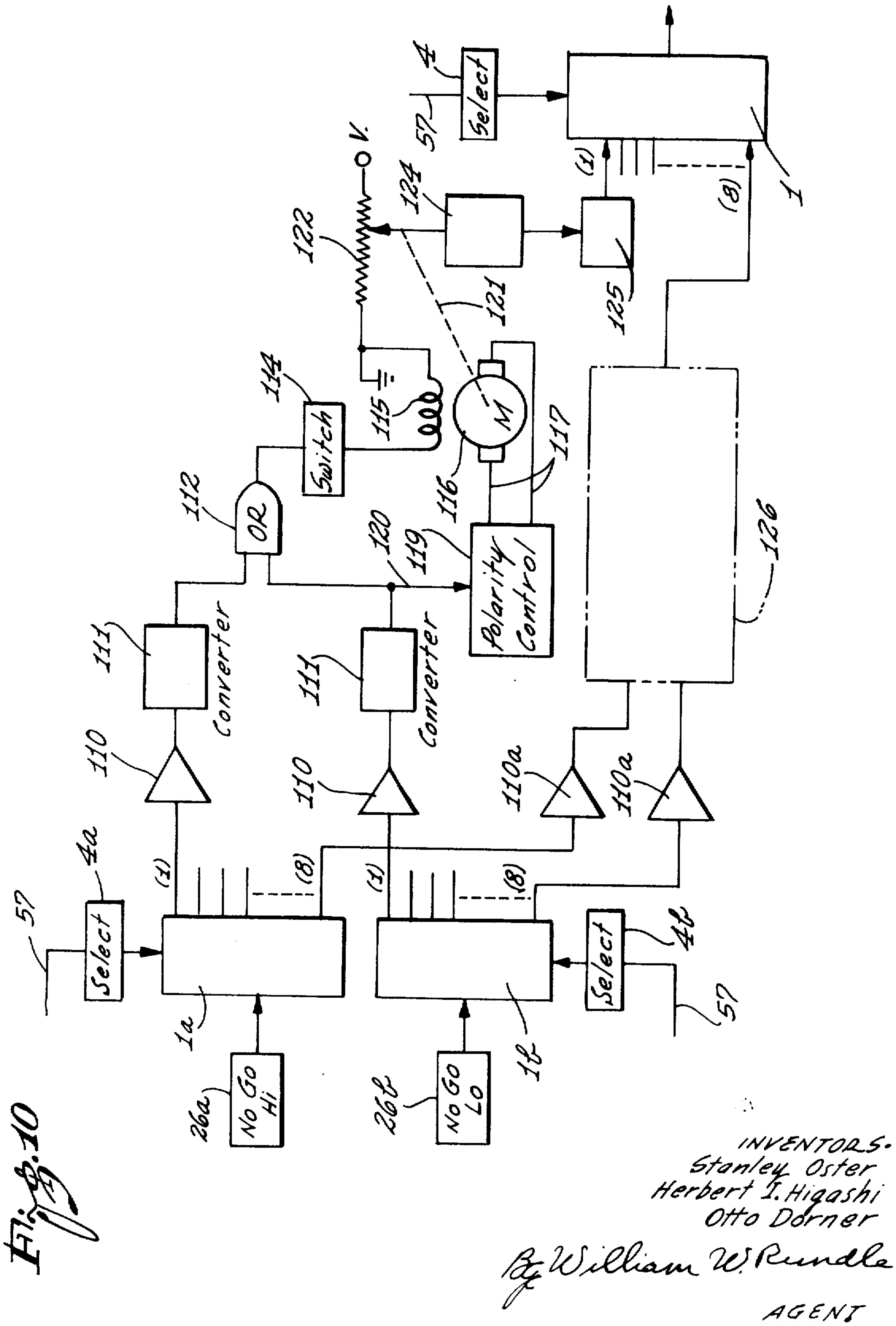

FIG. 10 is a block diagram of a servo control system connected into the present test unit for the purpose of automatically correcting an out-of-tolerance condition.

Referring first to FIG. 4 for a detailed description, a multiplexer 1 is provided which has a multiplicity of solid state switches, at least one switch to connect each of a number of test points from the system under test to the present test unit. The other sides of the switches from the system points to be tested are all connected together in a common output line which is conventional practice, this common line acting like the pole connection of a multiple-position selector switch. Any number of test points may be accommodated, 256 being represented here. The system under test is instrumented with sensors and/or transducers that convert all signals at the test points to a d.c. voltage between −5 and +5 volts. Eight multiplexer switches, for example, are located on one chip module 2, and four chips 2 may be combined on one card.

One test point switch at a time is closed during test operation, as controlled by a chip selector 4 and a switch selector 5. A chip is selected by a signal on one of 32 chip select lines 6 connected respectively to each chip, there being two chips numbered 32 as will be explained presently. A single switch is selected by a binary signal on three switch select lines represented on the drawing by a single switch select line 7. All 32 chips receive this signal in parallel, and decoding logic (not shown) on each chip selects one of the eight switches corresponding to one of the eight binary signal combinations on the three switch select lines. Although a certain switch number on each chip is simultaneously "selected," only the one on the selected chip is actually closed. The chip select signal advances at a frequency ⅛ that of the switch select signal, so that all eight switches on one chip will be sequentially closed, followed by the eight on the next chip in order, and so on.

In some applications, measurements of a system under test must be performed differentially. In such case both circuit sides must be operated in parallel, whereas normally one of the circuit lines is grounded.

The two chips labelled 32 in FIG. 4 illustrate the differential condition. It is seen that both test points number 249, for example, are operated in parallel, one going to one side of the test line, and the other going to the other side to complete the circuit.

The single-ended outputs from multiplexer 1, i.e., the common output lines of the solid state switches, are fed to a first buffer amplifier 9 which maintains a high input impedance to the system under test. With a very large number of test points, the input impedance is primarily dependent upon test point switch leakage rather than on the buffer amplifier input impedance. In differential operation, both sides of the test point circuit, for test point 249 for example, are buffered, using a second buffer amplifier 10. The difference signal is then obtained by a combining amplifier 11. The output of combining amplifier 11 is an analog voltage having a value between −5 and +5 d.c. volts, and is the signal to be measured. This output is fed to a comparator 12 along with known values of test signals for comparison, which are generated by an analog-to-digital converter 14.

The analog-to-digital converter 14 uses a conventional method of successive approximation to produce a 10-bit digital number corresponding to the value of the analog signal to be converted. Simultaneously with the closing of a test point switch in the multiplexer 1, the analog-to-digital (A/D) converter 14 is given a command to start conversion by a control pulse fed in on a control pulse line 15. A first switch in the A/D converter closes to apply one-half of a d.c. reference voltage (−5.12 volts) to a buffer-offset amplifier 16. This input applied to the buffer-offset amplifier 16 would result in an output of −5.12 volts if an offset voltage were not present also. The offset voltage is used to eliminate negative test voltages by making all analog signals appear to be boosted above ground potential. This offset voltage prebiases the buffer-offset amplifier 16 to +5.12 volts, so that the actual output voltage on amplifier output line 17 is zero volts for this first control pulse period.

In the comparator 12, a decision is made that determines if the analog value from the multiplexer is greater or less than the output from the A/D converter 14. When the analog is greater, a "one" is generated by control logic 19 connected to the output of comparator 12 and fed back to the A/D converter 14 on control line 20; when the analog is less, a "zero" is fed back on control line 20. The "one" or "zero" decision from the comparator 12 also is fed to the output of the control logic 19 to become the first bit in a 10-bit digital number. This first bit, if a "one" indicates positive polarity of the analog, and if a "zero" indicates negative polarity.

The next control pulse would try a value of +2.56 volts on amplifier output line 17 to the comparator 12. This time, assuming a +3.0 volt analog signal for example, then since +3.0 is greater than +2.56, another "one" is generated by the control logic 19. The next lower significant bits (1.28, 0.64, etc.) as set up in the A/D converter 14 are likewise tried, compared, and retained or rejected depending on the comparator decision, until ten bits have been accomplished. In the case of the +3.00 volt analog value, it is thus seen that the digital signal representing this value is 1100101100 sent from the control logic output on digital data line 21, as indicated in FIG. 8f.

The 10-bit measured value on digital data line 21 is fed to a high limit comparator 22 (FIG. 5) and to a low limit comparator 24 simultaneously. The high limit number for the particular test point under consideration is also fed to the high limit comparator 22, and the low limit number is also fed to the low limit comparator 24, from a memory 25 to be described later. The measured values and the limits are all synchronized by control pulses.

High and low comparators 22 and 24 are conventional serial comparators, which means that the most significant (first) bit is compared first, then the next most significant bit, and so on until all ten bits have been compared. These comparators decide if the test point value exceeds the high limit, is within the limits, or is less than the low limit, and carries the decision in four decision storage flip-flops 26. Outputs from these flip-flops are applied to a holding register 27.

Figure 1:
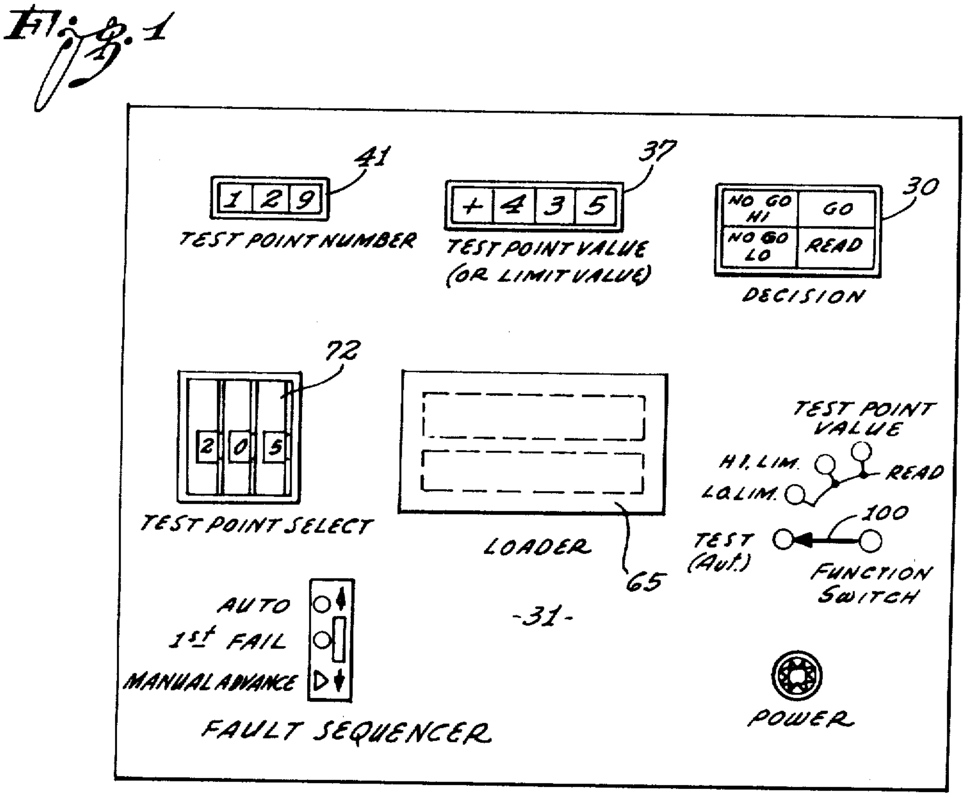
FIG. 1 is an elevation view of the control panel of the present instrument, showing location and appearance of the controls and indicators.

A NO GO detector 29 is connected to the NO GO HIGH flip-flop **26*a* and NO GO LOW flip-flop 26*b* to result in a NO GO signal when such a condition occurs. When all ten bits of each individual test point are examined, the proper decision is dumped into a decision display 30. This display is located on the tester control panel 31 as shown in FIG. 1**, and comprises a group of four lights labeled as shown.

At the same time as the limit comparison is being made, the digital measurement on data line 21a is also being applied to a temporary value display storage 32 from where it is fed to a value display holding register 34 which converts the binary value into a decimal value and holds it. The detection of a NO GO condition by the NO GO detector 29 sends a signal on detector line 35 through a fault sequencer 36 to the register 34 to transfer the actual measured value to a value display 37. Value display 37 is also located on control panel 31, and comprises a set of four visual read-out tubes, one for a polarity sign and the other three for the decimal numerical value of the measurement which is out of tolerance.

At this time, it will also be mentioned that a test point counter 39 (FIG. 5) is incorporated into this tester. The counter feeds its count into a test point display holding register 40 similar to the value display holding register 34. When the NO GO detector line 35 is activated, the test point display holding register 40 is also caused to transfer its information to a test point number display 41. The latter display is also on control panel 31, and comprises a set of three illuminated numerical read-out tubes for indicating the test point number at that time.

It is thus seen that upon detection of a malfunction in the system under test, there is a simultaneous display on the automatic test unit of the actual measured test point value, NO GO HI or NO GO LO, and the test point number at which the malfunction is found.

At this point, the basic timing features to regulate operation of the test unit will be described. An 800 Khz oscillator 42 is provided as shown in FIG. 5. A normal clock rate of 40 Khz is obtained on a clock pulse line 46 by dividing by 20, and a further divider 44 gives 1.25 Khz instead of 40 Khz when divider 44 is switched into the circuit. The slower frequency applies when a magnetic tape unit is being used as will be described later.

A bit counter 45 is connected to clock pulse line 46 through a delay switch 47. Ten bits (clock pulses) are counted by bit counter 45, and then the delay switch 47 is actuated by switch logic 49 to apply the clock pulses to a delay counter 50. The latter counts four clock pulses and then, working through the switch logic 49, returns the delay switch 47 to its upper position which is connected to the control pulse line 15 and also back to the bit counter 45.

The ten consecutive clock pulses on control pulse line 15 provide the A/D converter 14 the ten control pulses for sampling a test point as described previously. At 40 Khz, the ten control pulses take 250 micro-seconds of time. Next, the four-bit delay takes 100 micro-seconds at which time the multiplexer output line is discharged and there is time for measurement information to be transferred to the displays. After a four-bit delay, another test point is sampled during the next ten control pulses and so on. This gives a timing of control pulses 51 as shown in FIG. 8a.

A control signal generator 52 is connected to the control pulse line 15 as shown in FIG. 5, and a strobe generator 54 is connected to the signal generator 52. Output of the strobe generator 54 is shown in FIG. 8*d*, and this is fed to both the limit comparators 22 and 24. This signal furnishes the pulses to compare the respective measured signal bits on digital data line 21 with their corresponding limit bits from the memory 25. This comparison is preferably made to occur at the end of the respective A/D converter control pulses 51.

The signal generator 52 has two other outputs to clock pulse switches 55 and 55*a* which are used to provide the required two-phase clock signal to the memory. In the normal position of these switches 55 and 55a, and during normal automatic testing operation of the tester, the $\phi_1$ and $\phi_2$ clock signals (FIG. 8*b* and 8*c*) to the memory 25 are also at a 40 Khz rate and have the same timing (10 on and 4 off) as the control pulses 51.

Another timing signal is provided by scan control logic 56 connected to the delay counter 50. This signal is fed on scan line 57 to the input of the multiplexer selectors 4 and 5 to initiate each succeeding test point switch closure. The scan signal is a single pulse 59 (FIG. 8*e*) timed to occur at the desired time during the four-bit delay. After the exact number of test points accommodated by the multiplexer and the memory have been scanned through, the multiplexer must then start over again at test point number one. If the multiplexer switch selectors do not inherently provide logic for such repeat operation, an "end of scan" signal from other sections of the tester can be fed to the multiplexer to reset it to the beginning.

The memory 25 employed in this tester is the conventional dynamic shift register type. Such devices are thoroughly described and shown, together with their operation, in the pamphlet titled "MOS memory applications" number AN-7 published Sept. 1968 by National Semiconductor Corporation, Santa Clara, California 95051. There is actually a first 2,560-bit high limit memory 25*a* and a second 2,560-bit low limit memory 25*b* operated together. The bits in each memory are cyclically recirculating at a rate in accordance with the $\phi_1$ and $\phi_2$ clock pulses supplied thereto. In other words, when one bit, either a "one" or a "zero" is discharged from the memory output on its limit line 60 or 61, this same bit is also carried back and inserted in the memory input by feedback line 60*a* or 61*a*, through memory input logic 62 or 62*a*. Due to the fact that this type of memory requires constant recirculation for its operation, a power supply interruption will cause loss of the memory information, and necessitate a reloading before testing operation can be resumed. Therefore, memory loading means is provided in this invention.

Figure 2:
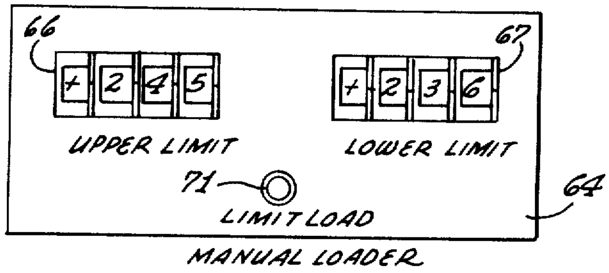
FIG. 2 is an elevation view showing the front panel of a manual loader.

A manual loader 64 is shown in FIGS. 2 and 6. This is a small separate unit which plugs into the main unit at a control panel opening 65 (FIG. 1). Four thumbwheel switches on the manual loader form high limit selector switches 66, and another four form low limit selector switches 67. One of the switches for each set is for polarity selection and the other three are for the desired value in decimal form. Any figure from −5.12 to +5.11 volts can be inserted. The selector switch numbers are applied to a code converter 69 which develops the offset binary form used by the instrument. The resulting binary limits are held side-by-side in registers 70. A LIMIT LOAD pushbutton 71 is provided. To load this limit information into the memory 25 with the test unit operating, the proper test point number is manually selected by setting three TEST POINT SELECT switches 72 on the main control panel 31, and then pushing the LIMIT LOAD button 71. This action sets up manual load enable logic 74 (FIG. 5) so that when the selected test point is arrived at during the scanning (as determined by the test point counter 39 in conjunction with a coincidence detector 75 connected to the TEST POINT SELECT switches 72), then the correct set of ten control pulses will pass the ten bits of the high limit serially to ten sequential positions in the high limit memory 25*a*, and simultaneously pass the low limit to the low limit memory 25*b*, through the memory input logic 62 and 62*a*. Thus, the high and low limits for one test point number are loaded into the proper place in the memory 25. Any and all other test point limits are similarly loaded in the memory.

Figure 3:
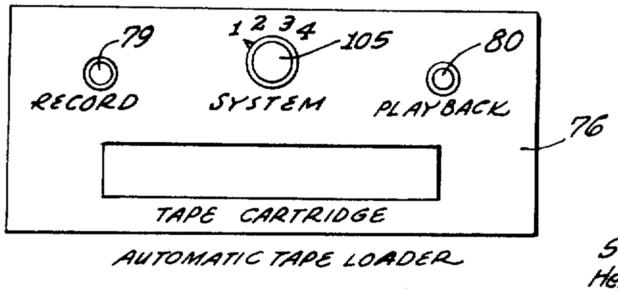
FIG. 3 is an elevation view showing the front panel of an automatic tape loader.

The data acquisition unit uses a magnetic recording tape unit to enable rapid and complete loading of limits into the memory once they are recorded on the tape. The tape also obviously provides a permanent record of limit data. A magnetic tape unit 76 is shown in FIGS. 3 and 7, connected to the indicated components in FIG. 5 when the tape unit is plugged into the control panel opening 65 to replace the manual loader 64. A standard endless tape cartridge 77 having two tracks is described in this embodiment; however a conventional two-channel tape cassette may be used if desired, by providing rewinding means. The tape unit 76 also contains a TAPE RECORD pushbutton 79 and a PLAYBACK pushbutton 80. When the tape unit is plugged into the main tester chassis, a motor switch (not shown) is preferably provided to automatically start the tape and have it continually running at rated speed.

The action and construction of the tape unit during recording of limits when the limits have been previously manually loaded into the memory 25 will now be described. It will be noted that the memory is kept running while the manual loader 64 is being replaced by the tape unit 76. A clock pulse head 81 and a data head 82 are provided for the tape so that it carries its own synchronizing pulses. At one place in the endless loop of tape, a transparent window 84 (FIG. 9) is provided, and a light source 85 behind this window is detected by a position sensor 86 once for each complete circuit of the tape 87. Position sensor 86 may be a photo-diode or any suitable type of photosensor. When the TAPE RECORD pushbutton 79 is pressed, nothing happens until, first, the end of tape is sensed by the position sensor 86, and second, an "end of scan" signal is received from the test point counter 39 on wire 87 which signifies that the tester scanning or sampling has just passed the last test point number 256 and is ready to begin again with test point number one. This insures that the data recorded on the tape will begin with the memory information relative to the first test point.

A multi-pole RECORD switch 90 in the tape unit 76 is thrown from NORMAL to RECORD at the "end of scan" signal. A portion of this switch 90 labelled R (FIG. 5) is actuated to switch in the extra divider 44 and thus reduce the clock pulse rate to 1.25 Khz. This of course also reduces the frequency of the control pulses from the signal generator 52, so that the memory 25 is still in synchronism with the multiplexer switching and with the test point counter 39. The slower speed is necessary because the usual magnetic tape does not have a satisfactory frequency response at 40,000 bits per second.

Also at this time, a limit serializer 91 (FIG. 5) is actuated. This takes all the high limits first from the high limit memory 25a and passes them one bit at time to a first tape drive 92, followed by all the low limits from the low limit memory 25b on the next memory cycle. From the tape drive 92, the limit data proceeds through the RECORD switch 90 to the data head 82 where the limits are recorded on the tape, with all high limits recorded in series and then all low limits recorded in series on the same track behind or after the high limits.

At the remaining pole of the RECORD switch 90, the 1.25 Khz clock pulses from the clock pulse line 46 feed through a second tape drive 94 and through the said switch to the clock pulse head 81 where they are recorded on a second tape track, obviously synchronized with the data bits on the first track. It will be noted that as recorded on the tape, there is no time or position skip between the data bits of two adjacent test point numbers. Thus, the 1.25 Khz clock pulse rate to the memory from the signal generator 52 must be continuous. After all limits have been recorded, the next end-of-tape signal from position sensor 86 returns the RECORD switch 90 to NORMAL.

The tape unit 76 may now be removed and kept with the limits for hat particular system test retained in recorded form. Likewise, any other tape cartridge may be provided with a different set of limits for the same system under test, or different limits for an entirely different system to test.

When the present tester is brought up to test a given system, it will be plugged in, turned on, and connected to the system under test, and the tape unit having the proper test point limits is plugged into the tester. Then to load the memory 25, the PLAYBACK pushbutton 80 on the tape unit is pressed. As with the tape recording procedure, the unit waits momentarily until the end-of-tape signal comes from the position sensor 86 and the end of scan signal comes from wire 89a. Then the clock pulse switches 55 and 55a in the main unit (FIG. 5) are actuated from NORM to PB just as the first test point limit cell in the memory is coming up. A portion of the switch labelled P (FIGS. 5 and 7) reduces the scanning speed to 1.25 Khz again, during tape operation. The data on the tape is put into usable form in a pulse shaper and limit separator 95 which directs the serially played-back limits to their appropriate memory inputs. To assure synchronization of clock signals and data going into the memory 25, playback clock pulses are generated from the data received off of the tape in a playback clock generator 96, and fed to the memory through the PB position of the clock pulse switches 55 and 55a. A playback counter 97 connected to the playback clock generator 96 keeps track of the number of bits comprising the high limit and low limit data as it comes from the tape and controls gate logic 99 admitting the high limits to the high limit memory 25a and the low limits to the low limit memory 25b. This playback counter 97 counts off the exact total number of bits contained in the two memories 25a and 25b together, at which time the memory loading is completed, and then automatically returns the clock pulse switches 55 and 55a to NORM.

A function switch 100 on the main control panel 31 is provided to select different modes of operation of the present data acquisition unit. In the TEST position of this switch, the instrument is in normal automatic testing operation in which the test points are being continually scanned, measured and compared as previously described. GO or NO GO information is displayed depending on the comparison decisions. Additional details of the NO GO operation will now be described.

The fault sequencer 36 referred to previously, as shown in FIGS. 1 and 5, has three manually selected positions. In the center, FIRST FAIL position, the first test point to be found out of tolerance during the scanning causes the proper NO GO light to be illuminated, together with the exact measured value and the test point number being displayed as previously described. This one display will continue to appear, although the scanning and measuring are still going on. IN this way, the actual measured value display will be updated each scan cycle so that changes in the value are observed. If the value should return within limits, the display would of course revert to a GO indication for that condition.

If the fault sequencer 36 is moved to the momentary-contact position MANUAL ADVANCE, the holding registers 27, 34, and 40 will be cleared and the display for the next faulty point (if any) will appear and be held. If the fault sequencer 36 is moved to the AUTO. position, the displays will move from one NO GO point to the next at a rate of about one per second, for example, so that all existing faults are alternately displayed. For this purpose, a separate oscillator 101 is connected to the fault sequencer for the AUTO. operation.

The other positions of the function switch 100 are READ positions for reading the low limit or high limit as stored in the memory, or the measured value of any test point selected by the TEST POINT SELECT switches 72. As shown in FIG. 5, the function switch 100 is connected through display enable logic 102 to the coincidence detector 75 so that at the time the selected test point number is being examined, the information in the value display holding register 34 is released to the value display 37. The selected value to be read, i.e., low limit, high limit, or measured value, is gated into the temporary storage 32 by one of three switch logic blocks 104 controlled by respective positions of the function switch 100. An end-of-scan signal is preferably connected to the function switch 100 by wire **89*b* so that when the latter switch is returned to the TEST position, the automatic sequence testing will begin again at test point number one. In all of the three READ positions of the function switch 100, the READ light of the decision display 20** in on.

Another feature of the present invention is the capability of carrying different test system limits in one tape unit. Plenty of tape is available in one cartridge to have recorded thereon several sets of limits at different respective positions along the tape length. In front of and behind each recorded set, distinctive index signal means are provided on the tape. This may be an extension of the means shown in FIG. 9 to include a combination of various small windows at different positions across the width of the tape associated with narrow focussed light beams and a plurality of respective detectors, or any other suitable coded tape indexing means. A system selector switch 105 on the tape unit panel (FIG. 3) is provided for the operator to select any one of four, for example, sets of system limits, so that the same instrument and the same tape unit is automatically usable to test or monitor any of several different complex machine or process systems. Using a tape speed of 7½ inches per second with a 256 test-point system, for example, less than three feet of tape is required per system, thus giving a potential of 100 or more systems per tape assembly.

It will be noted that all the bit positions in the dynamic type of memory must be used. After choosing a memory with a sufficient bit capacity for the system having the greatest number of test points to be tested, dummy information should be used to load the unused number of memory bits for the other systems to be tested having lesser numbers of test points. The unused multiplexer input connections in such cases can be grounded to zero volts, and the "limit" values recorded for them may be set "wide open" so that a GO condition will be reflected for these unused test points. Since the speed of operation of the tester embodiment described herein is nearly 3,000 test points per second, the extra time taken to scan through unused points is negligible.

The switches shown schematically in the present drawings are all solid-state components in the actual tester equipment.

It is thus seen that an out-of-tolerance condition is instantly indicated and identified to the operator.

Besides the basic testing functions as described hereinbefore, the present invention acts as a controller when put in a control loop. FIG. 10 shows one example of this. Tied into the NO GO HIGH and NO GO LOW flip-flops **26*a* and 26*b* are the respective inputs of two additional multiplexers 1*a* and 1*b* which are required to work in synchronism with the test point multiplexer 1, and do so by having their selectors connected to scan line 57. In FIG. 10, it is the output of the multiplexers 1*a* and 1*b*** which are the individual switch lines representative of the test points.

If, for example, test point number one comes from an adjustable function such as a fluid flow rate, temperature of an oven, and so on, which is desired to be controllable, the output lines from switch number one of each multiplexer **1*a* and 1*b* will be connected through an amplifier 110, if required, to a suitable signal converter 111. This converter 111 is a data conditioner which translates the one NO GO pulse per scan cycle to a d.c. signal voltage. The d.c. voltage is required to return to zero or "off" when the aforesaid pulses stop. For instance, the converter 111** may be a one-shot multivibrator having an "on" time slightly longer than the pulse period (scan cycle of all test points) and capable of being restarted or reset while in the "on" condition.

Outputs of the converters 111 are fed to the respective two inputs of an OR gate 112, so that either a NO GO HIGH signal or a NO GO LOW signal will turn on a motor control switch 114 in the output of the OR gate 112. The control switch 114 energizes a field coil 115 of a reversible d.c. motor 116, for example, having an armature coil connected by electrical leads 117 to a polarity control 119. The polarity control 119 may be merely a polarity reversing switch, connected by a control wire 120 to either one (but not both) of the signal converters 111. This motor arrangement is such that in the presence of a NO GO HIGH signal from flip-flop **26*a* at test point number one, the motor 116 will revolve in one direction, and with a NO GO LOW signal from flip-flop 26b under the same circumstances the motor 116** will revolve in the opposite direction.

In the present example, mechanical transmission means 121 connects the motor drive shaft to a control potentiometer 122 for adjusting the signal to a device to be controlled 124. This device is the component or function of the system under test which is desired to be controllable. A suitable sensor 125 operatively connected to controllable device 124 is part of the basic equipment used by the test unit to sense the value of the parameter being measured and feed the required representative input signal to test point number one of the multiplexer 1 (FIGS. 10 and 4).

Naturally the motor 116 and potentiometer 122 are arranged to apply the corrective signal to device 124 in the direction to reduce the error. As soon as device 124 measurement returns to within tolerance, the NO GO signal ceases and the motor 116 stops. Thus the servo loop has acted to automatically correct the operation of the system under test.

As also shown in FIG. 10, any other test point or test points can be similarly automatically corrected, for instance test point number eight. At the output line of multiplexers **1*a* and 1*b* corresponding to test point number eight, amplifiers 110*a* are similarly connected through a servo-mechanism 126 shown in phantom lines back to the input of test point number eight of the test unit multiplexer 1. As mentioned briefly before, servo-mechanism 126** may comprise any suitable combination of conventional actuator and output sensor connected to whatever controllable device it is desired to adjust. This may include a measure of position, pressure, an acceleration, velocity, temperature, flow rate, electric current, frequency, time, or pulse width, and so on.

Naturally the servo-mechanism 126 and its mechanization into the data acquisition unit can be accomplished in many ways. The structure of FIG. 10 is but one preferred example. In another embodiment the two multiplexers 1a and 1b can be combined into one, if desired, connected to the NO GO detector 29, with the required distinction between NO GO HIGH and NO GO LOW being accomplished by logic means following the converter 111, for example. Other equivalent apparatus performing the function of the embodiment in FIG. 10 is deemed to be included within the scope of the present invention.

Further, it will be seen that the present data acquisition unit has the capability of stopping its cycling of test points, under program control, and locking on to one test point. In this "tracking" mode it can sample the time function of the signal at a rate of nearly 3,000 samples per second. It follows, from the fundamental theorem of sampling, that this unit can acquire information in a 1500 hertz bandwidth. Thus, with appropriate programming of its memory elements the device could track, compare with limits, and identify whether a certain time profile lies within set limits. For example, it could in effect place a launch trajectory for a missile or vehicle within a specified corridor.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. Apparatus for automatically monitoring signals at a plurality of test points of a system to be tested, comprising multiplexer means for selectively coupling test point signals at a plurality of input connections to a single output, analog-to-digital converter means connected to the output of said multiplexer means for converting said signals to digital data, memory means for storing tolerance limit data for signals at said test points, respectively, comparator means for comparing the digital data output of said converter means with stored tolerance limit data, scanning means connected to said multiplexer means and to said memory means for causing said multiplexer means to couple test point signals from said input connections to said converter means in sequence and for causing said memory means to feed tolerance limit data to said comparator means synchronized with corresponding digital data fed to said comparator means from said converter means, and at a sequencing rate at least of the order of several hundred to a thousand test points per second, detector means connected to the output of said comparator means for determining whether a signal is within tolerance or out of tolerance, and display means connected to the output of said detector means for producing a GO condition or a NO GO condition depending upon the respective determinations by said detector means.

2. Apparatus in accordance with claim 1, further comprising means including a recorder for recording tolerance limit data, said recorder having playback means for inserting recorded limit data into said memory means.

3. Apparatus in accordance with claim 2, wherein said recorder comprises means for recording a plurality of sets of tolerance limit data and index means for selecting any desired set of recorded limit data, and wherein said playback means is responsive to the set of limit data selected by said index means.

4. Apparatus in accordance with claim 1, further comprising manual means for inserting tolerance limit data into said memory means, one test point at a time, at locations in said memory means corresponding to the respective test points.

5. Apparatus in accordance with claim 4, further comprising means for recording tolerance limit data, and means for inserting the limit data from said memory means into said recording means.

6. Apparatus in accordance with claim 1, further comprising display means for indicating the magnitude of a signal at a test point and display means for indicating the identification of a test point corresponding to a NO GO determination.

7. Apparatus in accordance with claim 1, wherein said memory means has means for storing low tolerance limit data and high tolerance limit data for said test point signals, and further comprising display means for selectively indicating any one of the low tolerance limit data, high tolerance limit data, and signal magnitude for any selected test point and display means for indicating the identification of the test point.

8. Apparatus in accordance with claim 1, further comprising means for causing said display means to indicate NO GO determinations, if any, in sequence.

9. Apparatus in accordance with claim 1, wherein said memory means comprises a dynamic register electronic memory, means including a magnetic tape recorder unit for recording tolerance limit data, said tape recorder unit having tape playback means for inserting said limit data into said memory means, and means for automatically reducing the sequencing rate of said scanning means during the inserting operation.

10. Apparatus in accordance with claim 1, wherein said memory means comprises a pair of dynamic register electronic memories operating in parallel for storing, respectively, high tolerance limit data of each test point and low tolerance limit data of each test point, said scanning means comprising means for simultaneously feeding limit data from each memory to said comparator means along with the corresponding digital data from said converter means.

11. Apparatus in accordance with claim 1, wherein said memory means comprises a pair of memory units operating in parallel for storing, respectively, high tolerance limit data and low tolerance limit data corresponding to each test point, and means including a magnetic tape recorder for recording all test point high limit data in series with all test point low limit data, said recorder having playback means for inserting the recorded limit data into said memory means, said playback means including separator means for inserting high limit data into one of said memory units and then inserting low limit data into the other memory unit.

12. Apparatus in accordance with claim 1, wherein the system to be tested has, for at least a certain test point, a controllable device for changing the signal at such test point, and further comprising additional multiplexer means for connecting said detector means selectively to any one of a plurality of lines corresponding to test points, means for operating said additional multiplexer means in synchronism with the first-mentioned multiplexer means, means connected to the lines of said additional multiplexer means corresponding to said certain test points for producing a steady error signal in response to an out of tolerance determination by said detector means, and actuator means responsive to said error signal for operating said controllable device to reduce said error signal.

13. Apparatus in accordance with claim 1, wherein the system to be tested has, for at least a certain test point, a controllable device for changing the signal at such test point, and further comprising additional multiplexer means for connecting said detector means to any one of a plurality of lines corresponding to test points, means for operating said additional multiplexer means in synchronism with the first-mentioned multiplexer means, and a servo-mechanism having its input connected to a line corresponding to said certain test point and its output connected to said controllable device for adjusting said device in a direction to eliminate an out of tolerance determination by said detector means.

14. Apparatus in accordance with claim 1, there being a plurality of such controllable devices and servo-mechanisms for corresponding test points.

* * * * *